Feb. 12, 1957 G. RÖSCH 2,781,004
JOURNAL BOX MOUNTING FOR ROLLER AXLE BEARINGS
Filed June 29, 1954
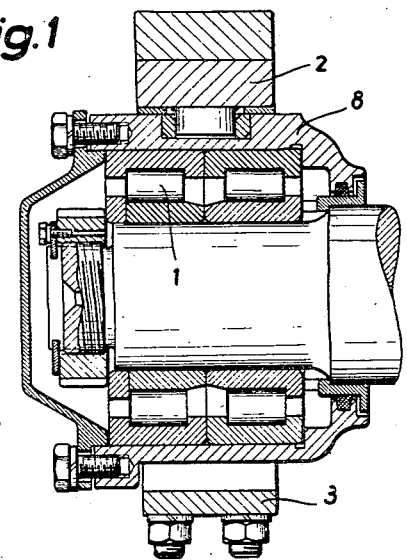
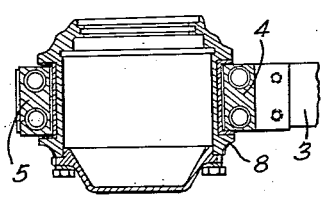
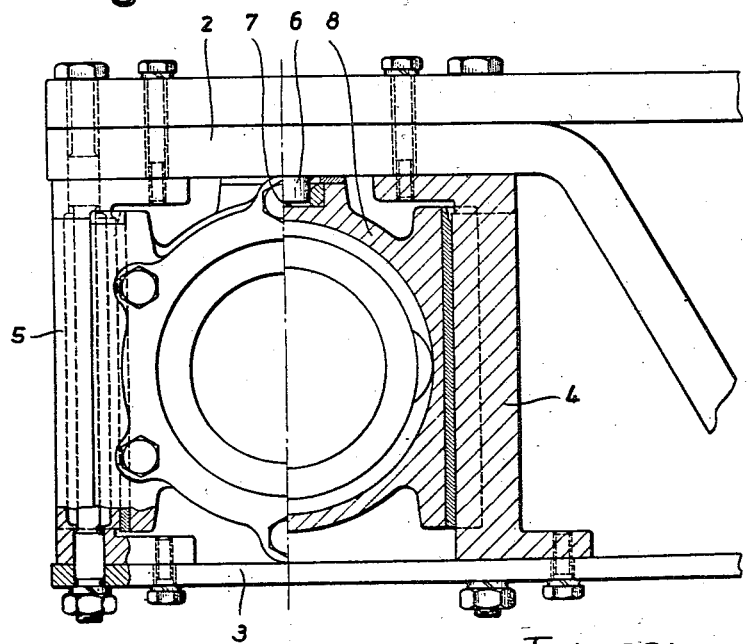
INVENTOR:
GEORG RÖSCH
BY:
Moore & Hall
ATTORNEYS

United States Patent Office 2,781,004
Patented Feb. 12, 1957

2,781,004
JOURNAL BOX MOUNTING FOR ROLLER AXLE BEARINGS

Georg Rösch, Schweinfurt, Germany

Application June 29, 1954, Serial No. 440,210

Claims priority, application Germany July 4, 1953

4 Claims. (Cl. 105—221)

It has been known practice in the case of bogie axle boxes containing roller bearings, and particularly in the case of trussed bogies (diamond bogies) for rail vehicles, to manufacture said axle boxes by single-part production methods and then to install them on said bogies. This practice results in the use of a large number of different types of axle boxes, thus requiring railroad companies to maintain considerable stocks of spare parts. Moreover, axle bearing arrangements of the type referred to are expensive, as they can be manufactured in small lots only.

The present invention eliminates the above-mentioned drawbacks by providing for roller type axle bearings of standard dimensions to be mounted on a bogie frame with the aid of two guiding members or plates of which one has a substantially U-shaped cross section, while the other has a substantially Z-shaped cross section. In a specific embodiment of the invention, the U-shaped guide plate just referred to is mounted for quick and easy removal on the end of the bogie frame. It is obvious that this method of arranging roller type axle bearings on truss bogies (diamond bogies), while tending to require smaller spare parts inventories due to the fact that mass-produced standardized roller type axle bearings may be used, greatly simplifies and facilitates both installation and removal of such bearings. Furthermore, the hereinbefore mentioned guide plates serve positively to locate the associated axle box in an axial direction as well as in the direction of travel of the vehicle.

The invention will be more readily understood by way of example from the following description of a preferred embodiment of a roller type axle bearing arrangement for truss bogies (diamond bogies) of the type used in rail vehicles, reference being made to the accompanying drawing in which:

Figure 1 shows an axial sectional elevation of the said embodiment;

Figure 2 is an end view, partly in cross section, of the said embodiment, and

Figure 3 is a horizontal cross-section looking downward, of the mounting of Figure 2.

As will be seen in Figs. 1 through 3, the roller type axle bearing arrangement indicated at 1 is mounted between the upper chord member 2 and the lower chord member 3 of the truss bogie (diamond bogie). The guide plate 4, which is of Z-shaped cross section in a plane perpendicular to the center line of the wheel axle, is bolted to the bogie frame. The outer guide plate 5, which is of U-shaped cross section in a plane perpendicular to the center line of the wheel axle, is also bolted to the bogie frame in such a manner as to provide for easy removal of this guide plate. The inner guide plate 4 must be given a Z-shaped cross section, because it remains in position on the bogie frame during removal of the axle box; if the member 4 had a U-shaped cross section, the lower flange of the U pointing towards the axle would interfere with a downward movement, i. e. the removal of the axle box from the bogie. The two plates 4 and 5 serve properly to locate the axle box. The latter may be designed with either "open" or "closed" guide ways, i. e. the U-section guide plate 5 and the Z-section guide plate 4 may be embraced by the axle box guide ways from three sides ("closed" guide ways) or from two sides only ("open" guide ways).

A peg 6, which is welded to the upper chord member 2 of the bogie frame, projects into a spring clip bore 7 provided in the axle box housing 8 and thus transmits the load supported by the bogie frame to the roller type axle bearing arrangement 1.

To remove the set of wheels from the bogie it is only necessary to remove the U-section guide plate 5 and then to lift the bogie 2. These manipulations will cause the peg 6 to be disengaged from the spring clip bore 7 so that the set of wheels may be rolled out to the left (in Figure 2) from under the bogie frame.

I claim:

1. An arrangement for mounting an axle box on trussed bogies of rail vehicles, said trussed bogies including a frame member having upper and lower chord members, comprising an axle box located on the said bogie frame between said upper and lower chord members, a first guide plate of substantially U-shaped cross-section fastened between said upper and lower chord members and engaging one side of the said axle box, a second guide plate of substantially Z-shaped cross-section fastened between said upper and lower chord members and engaging the opposite side of said axle box, each of said guide plates including upper and lower flanges disposed substantially horizontally, said guide plates being so disposed that the upper horizontal flanges of said first and second guide plates extend toward one another while the lower horizontal flanges of said guide plates extend toward the center of the bogie, said axle box defining a bore adjacent said upper chord member intermediate said first and second guide plates, and a peg-like projection secured to the said upper chord member and extending into said bore.

2. The arrangement of claim 1 wherein said U-shaped guide plate is disposed adjacent an end of said bogie frame, and bolt means removably securing said U-shaped guide plate between said upper and lower chord members of said frame, whereby ready access to and removal of said axle box may be effected by removal of said U-shaped guide plate.

3. An arrangement for mounting an axle box between the upper and lower chord members of a truss bogie, comprising an axle box including a roller type axle bearing assembly disposed between and substantially contiguous with said upper and lower chord members, a first guide plate of substantially U-shaped cross-section disposed between said upper and lower chord members, said first guide plate including upper and lower substantially horizontal flanges removably fastened to said upper and lower chord members, respectively, and said first guide plate further including a substantially vertical web between said flanges engaging one side of said axle box, a second guide plate of substantially Z-shaped cross-section disposed between said upper and lower chord members, said second guide plate including upper and lower substantially horizontal flanges fastened to said upper and lower chord members, respectively, and said second guide plate further including a substantially vertical web between said flanges engaging the other side of said axle box, said axle box defining a spring-clip bore adjacent said upper chord member, and a peg-like projection fastened to said upper chord member and extending into said spring-clip bore.

4. The arrangement of claim 3 wherein the said upper horizontal flanges of said first and second guide plates extend toward one another in opposing directions from their respective vertical webs adjacent said upper chord member; the lower horizontal flanges of said first and second guide plates extending in the same direction from their respective vertical webs adjacent said lower chord member.

References Cited in the file of this patent

UNITED STATES PATENTS

| | | |
|---|---|---|
| 1,299,528 | Yeager | Apr. 8, 1919 |
| 1,546,324 | Stafford | July 14, 1925 |